United States Patent [19]
Davis

[11] 3,928,713
[45] Dec. 23, 1975

[54] PRESSURIZED UNDERGROUND CABLE PEDESTAL

[76] Inventor: Glenn T. Davis, Rte. 2, Box 148-C, Monmouth, Oreg. 97361

[22] Filed: June 11, 1974

[21] Appl. No.: 478,323

[52] U.S. Cl. .............. 174/38; 174/17 R; 220/4 E; 220/18; 220/328
[51] Int. Cl.² ............................................ H02G 9/02
[58] Field of Search...... 174/17 R, 17 CT, 20, 22 R, 174/23 R, 37, 38, 60, 76, 77 R; 220/4 B, 4 E, 18, 328

[56] References Cited
UNITED STATES PATENTS

| | | | |
|---|---|---|---|
| 3,236,934 | 2/1966 | Revelle et al. | 174/22 R |
| 3,435,124 | 3/1969 | Channell | 174/38 |
| 3,480,721 | 11/1969 | Baumgartner | 174/38 |
| 3,523,156 | 8/1970 | Phillips, Jr. | 174/38 |
| 3,728,467 | 4/1973 | Klayum et al. | 174/38 |

Primary Examiner—Laramie E. Askin
Attorney, Agent, or Firm—D. Paul Weaver

[57] ABSTRACT

A pedestal for housing above-ground extensions of pressurized underground cables is provided comprising first and second vertically disposed front and rear mating portions defining a lower portion for enclosing cables and an upper splice chamber. The splice chamber is covered and sealed by a cap. In one form of the invention, coupling is provided between the splice chamber and an exterior terminal block.

6 Claims, 5 Drawing Figures

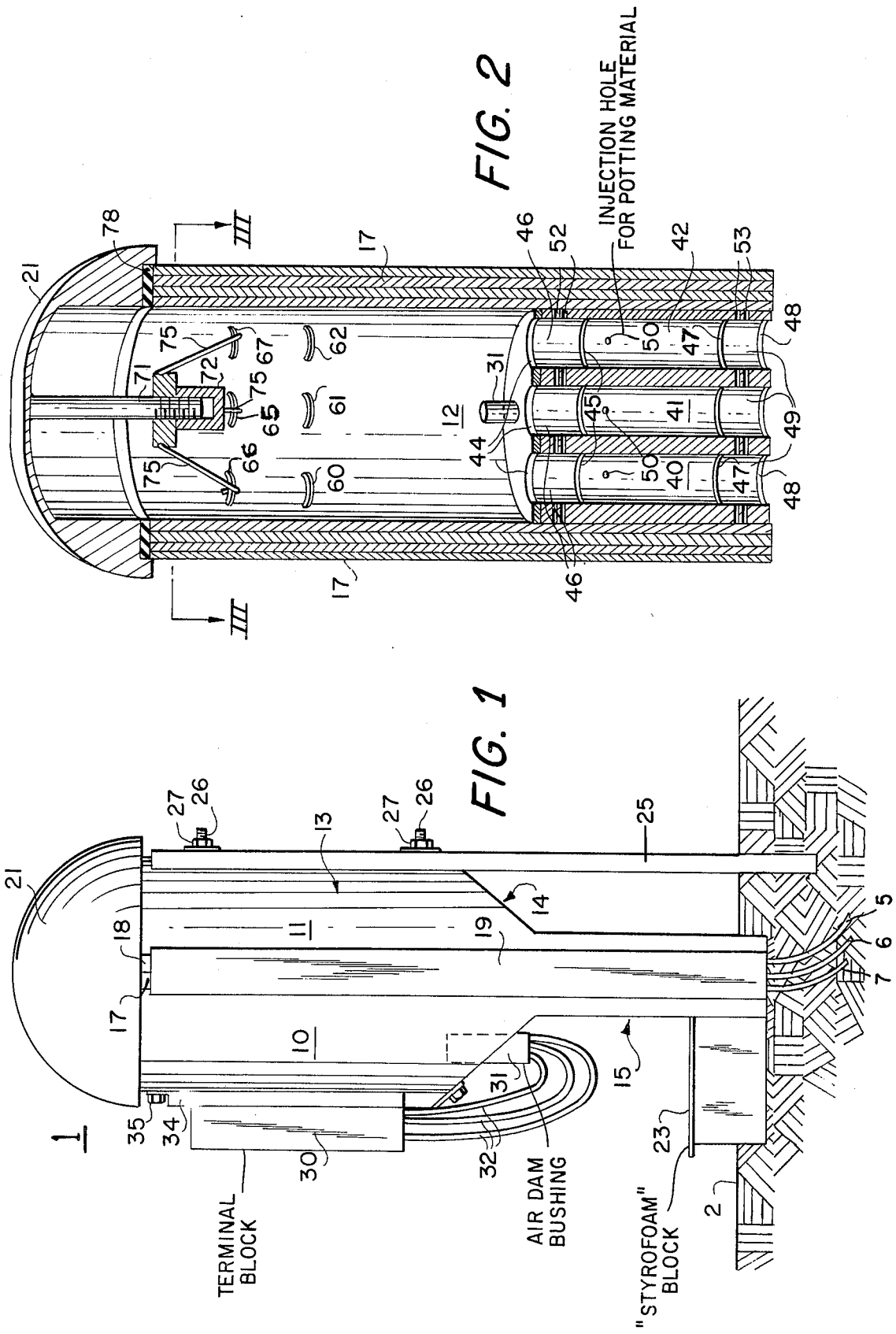

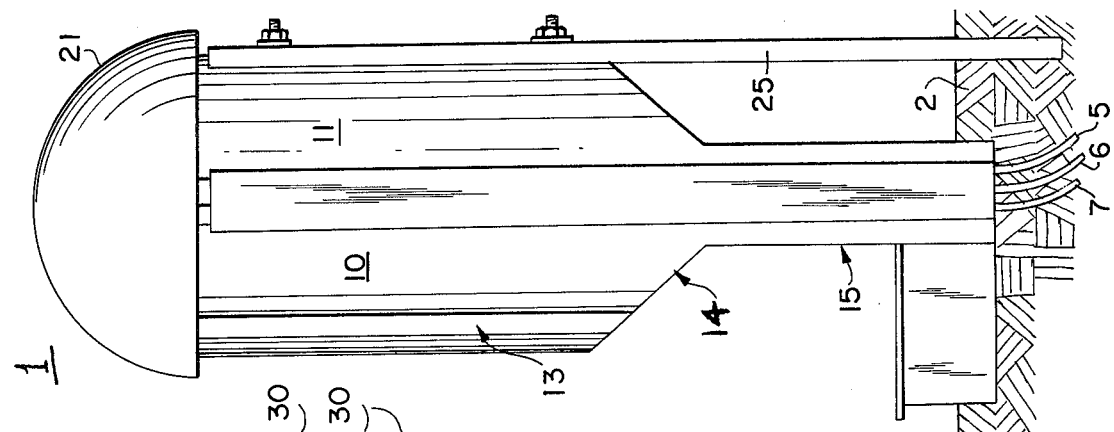
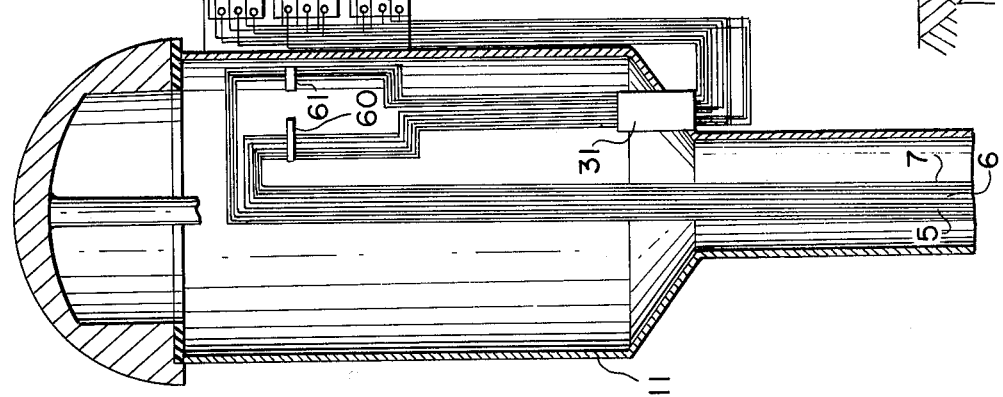
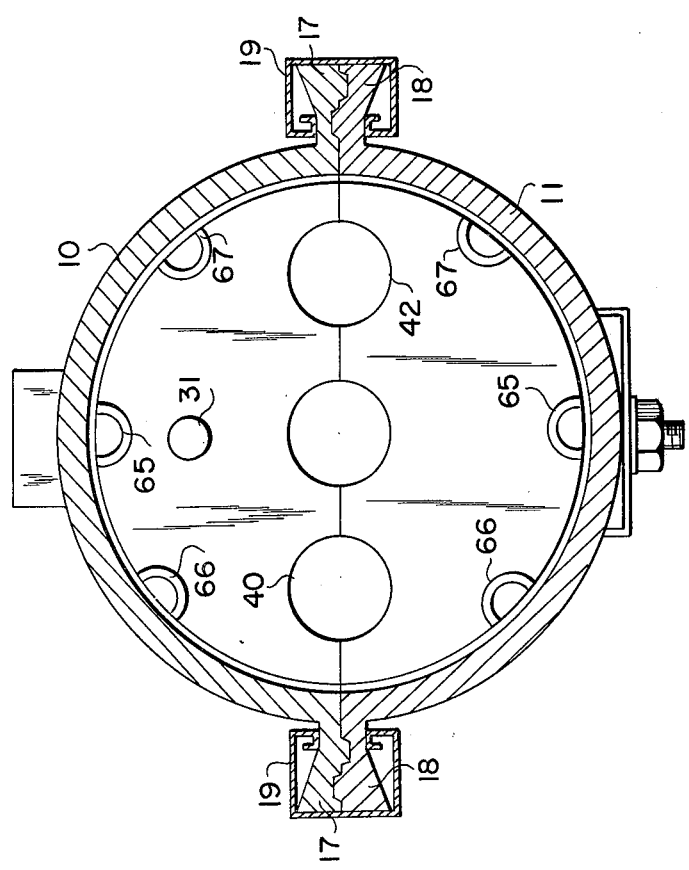

3,928,713

PRESSURIZED UNDERGROUND CABLE PEDESTAL

BACKGROUND OF THE INVENTION

This invention relates to outdoor above-ground electrical closures known as pedestals, and more particularly to pedestals for use in conjunction with pressurized underground cables.

Pressurized cables are used for underground communication cables such as telephone cables. A widely used means of pressurizing cables is a dry air machine. The dry air machine removes air from the atmosphere and drys it completely by freezing it in cycles until all of the moisture is removed. The purpose of moisture removal is to prevent deterioration and corrosion within the cable. Dry air is injected into the end of an underground cable at a specified pressure. Pressurization serves to protect the cable since, if a leak occurs, pressurized air rushes out of the leak location and prevents moisture from entering. The length of the cable to be serviced and the construction thereof are the main factors in determining the size of dry air machine required. A common pressurization utilized 8 psi. Such a pressure prevents moisture from entering the cable in typical applications and is yet not sufficient to explode or crack cables when they are softened due to sunlight or weakened by other meteorological or geological effects. Air pressurization is also useful in maintenance for determining the existence of leaks. If pressure is maintained but the cables are consuming amounts greater-than-normal of air, a leak is indicated. Known prior art alarms and circuits may be utilized to determine the location of a leak.

It is necessary that the underground cables have above-ground extensions. For example, it is typical that a telephone cable be extended above the surface of the ground at spaced intervals of a quarter of a mile or less. Access is thus provided to the cable so that it may be connected to individual telephone lines or spliced to other cables. The above-ground extension of the cable is housed in a pedestal. For the reasons described above, it is necessary that pressure be maintained in the cable even while providing above-ground accessibility. Other requirements for a pedestal are that it be serviceable from an electrical maintenance standpoint so that splices and connections to the cable may be made efficiently and reliably. A pedestal must also be of a mechanical design such that access to the interior chamber defined by the pedestal is facilitated, and so that the pedestal will withstand possible rough treatment in its installation.

One prior practice for maintaining cable pressurization having incoming and outgoing cables communicating with a pedestal is by damming cable ends with a compound and inserting an air bypass through the compound so that air can be passed on through the cables to a next pedestal. The method of damming and bypassing cables in each pedestal is costly and inefficient. While there have been pedestals provided which obviate the need for damming and bypassing, it is desired to provide in accordance with the present invention, a pedestal more fully embodying the desired merits of a pedestal as described above.

SUMMARY OF THE INVENTION

It is therefore an object of the present invention to provide a pedestal in which electrical maintainability is improved and mechanical access is facilitated.

It is a more specific object of the present invention to provide a pedestal of the type described which may include exterior terminal blocks to which reliable electrical connections may be made.

It is also an object of the present invention to provide a pedestal of the type described which is simplified in construction and facilitates efficient servicing by maintenance personnel.

It is also an object of the present invention to provide a pedestal of the type described which may easily be disassembled, assembled and repressurized.

It is yet another object of the present invention to provide a pedestal of the type described in which cables may be simply and reliably supported.

It is a further object, in one form of the present invention, to provide a pedestal of the type described having a pressurized inner chamber communicating with external terminal blocks for ease of servicing while maintaining cable pressure.

Briefly stated, in accordance with the present invention, there is provided a pedestal of first and second vertically disposed mating halves having a lower cable sealing portion and an upper portion defining a splice chamber which is preferably cylindrical. The splice chamber is covered by a cap. One of the two mating parts includes means for supporting cables. In one form of the invention, a bypass is provided from the splice chamber to the exterior of one mating section for providing electrical connections to exterior terminal blocks.

BRIEF DESCRIPTION OF THE DRAWINGS

The means by which the foregoing objects and features of novelty are achieved are pointed out with particularity in the claims forming the concluding portion of the specification. The invention, both as to its organization and manner of operation, may be further understood by reference to the following description taken in connection with the following drawings.

Of the Drawings:

FIG. 1 is a side view of a pedestal constructed in accordance with the present invention;

FIG. 2 is an elevation of the interior of the embodiment of FIG. 1 illustrated in perspective form and partly in cross section;

FIG. 3 is a sectional view taken along lines III—III of FIG. 2;

FIG. 4 is a side view partially in section of the embodiment of FIG. 2; and

FIG. 5 is a side view of a further embodiment of the present invention.

DESCRIPTION OF THE PREFERRED EMBODIMENT

Referring now to FIG. 1, there is illustrated a pedestal 1 constructed in accordance with the present invention supported in the ground 2, for housing above-ground extensions of cables 5, 6 and 7. While three cables are illustrated in the present embodiment, the invention may be utilized with other numbers of cables. The pedestal 1 includes front and rear riser portions 10 and 11 which mate to define a splice chamber 12 (FIG. 2) within an upper portion 13 and a cable sealing portion 15 adjacent the ground 2. The terms front and rear are used arbitrarily. The splice chamber 12 is preferably cylindrical, but may take other forms. The lower portion 15 extends into the ground for a selected distance. The front and rear riser portions 10 and 11 mate respectively at flanges 17 and 18 (see also FIG. 3) which provide a seal. First and second slidable closure members 19 each contain flanges 17 and 18 in abutment at opposite sides of the pedestal 1. The riser portions 10 and 11 are sealed by a cap 21 which is retained as explained below. A Styrofoam block 23 may be glued into place at the bottom of the cable sealing portion 15 and may extend above and below the level of the ground 2 in order to keep small animals and insects out of the pedestal assembly and to block moisture. The Styrofoam block 23 may surround the lower portion 15 or take other forms. The block 23 is shown abutting one side of the lower portion 15 in FIG. 1 for simplicity in the drawing. The use of Styrofoam allows service drops and side leads to be pushed through adjacent to cables easily. For further mechanical support, a stake 25 may be provided fastened to the riser portion 11, for example, by means of bolts 26 and nuts 27 for extending into the ground 2.

The embodiment of FIG. 1 provides for coupling of underground cables to external connections, e.g. home telephone connections. Therefore, terminal blocks 30 are provided fastened to the exterior of one riser portion, for example, the riser portion 10. An air dam bushing 31 is provided extending through the riser portion 10, and cables 32 extend therethrough from the splice chamber 12 to the terminal block 30. The terminal block 30 is mounted on any convenient means such as a bracket 34 retained by bolts 35.

While the riser portions 10 and 11 may have different shapes in accordance with the present invention, they are each preferably semi-circular in the upper portion 13 and taper along the tapering portion 14 to a relatively flat portion at 15 which is shaped as further explained below to accommodate cables. Since the riser portions 10 and 11 are sealed by the flanges 17 and 18 and the closure member 19 is slidable, assembly of the pedestal 1 is facilitated as is access to the interior thereof. As is further described below, the structure of the cap 21 also provides for convenient and reliable assembly, sealing and access. Further details of the interior of the pedestal 1 are illustrated in FIGS. 2, 3 and 4.

Referring now to FIGS. 2, 3, and 4, greater details of the interior of the pedestal 1 are illustrated. For simplicity of illustration, the cables 5, 6, and 7 are omitted from FIGS. 2 and 3. The lower portion 15 of the pedestal 1 is formed to have flat and curved portions such that cable chamber 40, 41, and 42, each for enclosing and sealing a cable, are defined. In other embodiments, more or fewer cable chambers may be provided. In each chamber 40-42, pairs of ribs 44 and 45 define an inner seal chamber 46 communicating with the splice chamber 12. Pairs of ribs 47 and 48 at the lower portion of the chambers 40-42 define outer seal chambers 49. The inner seal chamber 46 and the outer seal chamber 49 seal each cable at first and second locations where the lower portion 15 communicates with the splice chamber 12 and ground 2 respectively. Injection holes 50 may be provided intermediate the chambers 46 and 49 through which potting material may be injected further to seal the cables. An upper pair of ribs 52 and a lower pair of ribs 53 are provided in the flat portions of 15 which do not house cables. Referring in greater detail to the splice chamber 12, three loops 60, 61, and 62 are provided in the wall of the front riser portion 10 to which cables 5, 6, and 7 may be tied. The loops 60–62 comprise support means for cables, and may be integrally formed with the front riser portion 10 or may be provided by any other conventional means.

Cap retaining loops 65, 66, and 67 spread about the inner periphery of the front riser portion 10 are also provided, and preferably spaced above the cable retaining loops 60–62. In the preferred embodiment, identical loops 65, 66, and 67 are also provided on the inner periphery of the rear riser portion 11. Of course, any number of loops sufficient for retaining the cap 21 may be provided. The cap 21 is retained in the following manner. The cap has a bolt 71 preferably integrally formed therewith extending downwardly from its center and having a thread at the end. A tubular retaining member 72 is provided having a threaded portion for securing to the threaded end of the bolt 71, and the tubular member 72 has hooks 75 extending therefrom. In use, the tubular member 72 is initially introduced onto the bolt 71, and each hook 75 is hooked over one of the loops 65, 66, or 67. The cap is rotated until a tight fit between the cap 21 and the upper portion 13 is achieved. To better facilitate a seal, a sealing ring 78 is placed on the upper periphery of the upper portion 13. In one typical application, the tubular member 72 has a one half inch tapped hole in its center, and 6 eyes are welded on the periphery for supporting the hook members 75. The hook members may comprise 3/16 inch rods for hooking on to the tubular member 72 at one end and a hook on the other end for retaining the cap supporting rings 65, 66, or 67. The lower portion of the tubular member 72 is preferably coated to protect wires within the splice chamber 12. Sealing member 78 may be ½ inch wide and a quarter inch thick. Due to this construction, the sealing member 78 may be reused through several operations of opening and closing the pedestal 1 unless it is severely abused.

As illustrated in FIG. 4, the cables 5, 6 and 7 rise from the ground and come up through the lower portion 15, each cable extending through a chamber 40, 41, or 42 and being preferably tied to a ring 60, 61, or 62. Splices or connections may be made as desired, and wires may be lead out through the air dam 31 for connection to the terminal blocks 30. This arrangement permits an installer to change connections between the splice chamber 12 and terminal blocks 30 without having to open the pedestal 1. Consequently, service connections may be made without losing air pressure within the pedestal 1.

In a typical embodiment, the pedestal 1 is constructed of metal. It is preferable that all exposed metal be plated to prevent corrosion. The riser portions 10 and 11 may be 3 feet high, for example, and extend 2 inches into the ground. The outer diameter of the upper portion 13 may be one foot. The cap 21 may extend an inch on either side of the top portion 13. In such an embodiment the exterior cables 32, which may also be referred to as a stub, are conveniently 18 inches long. The closure member 19 may be provided with a tapered portion at one end for ease in sliding over the flanges 17 and 18. The lower portion 15 may have a width, as seen in FIG. 1, of 4 inches.

FIG. 5 represents another embodiment of the present invention in which the same reference numerals are used to denote elements corresponding to those of the embodiment of FIGS. 1–4. In this embodiment, all connections are made internally, and no communication is provided from the splice chamber 12 to the exterior of the pedestal 1. This embodiment is more useful for applications in which infrequent maintenance is required.

What is thus provided is a pedestal which is simple in construction and provides a reliable seal. Because access to exterior connections in one form is facilitated without entering the pressurized splice chamber 12, reliability is improved. Because the pedestal 1 can be put together in the field with a minimum amount of special tools and with a minimum amount of steps on the part of maintenance personnel, cost of use of the present invention is minimized. When it is necessary to have access to the interior of the pedestal 1, access is facilitated either through ease in removal of the cap 21 or by ease in removal of the closure members 19. Consequently, improved efficiency is the result. It should be realized that many modifications in the preferred embodiment may be made to provide a pedestal in accordance with the present invention. For example, the shapes of the riser portions 10 and 11 may be varied. The specification should enable those skilled in the art to make many other modifications to provide a pedestal constructed in accordance with the present invention.

What is claimed as new and desired to be secured by Letters Patent of the United States is:

1. A pedestal closure for enclosing above-ground extensions of underground cables comprising, a first riser portion, a second riser portion, said first and second riser portions mating and forming an upper pedestal portion comprising a splice chamber, an intermediate tapered pedestal portion and a lower relatively narrow pedestal portion, each of said riser portions having a curved internal element in said relatively narrow pedestal portion and the elements of the two riser portions being opposed and defining plural spaced cable chambers, means forming a seal between said first and second riser portions, a cap engaging with said riser portions and closing said splice chamber defined thereby, the cap including sealing means between an edge of the cap and edges of the first and second riser portions which the cap abuts, means maintaining the riser portions in contact, means in said splice chamber for supporting cables, and cable terminal blocks supported on the exterior of one of said riser portions.

2. A pedestal enclosure for enclosing above-ground extensions of underground cables comprising, a first riser portion, a second riser portion, said first and second riser portions mating and forming an upper pedestal portion comprising a splice chamber, an intermediate tapered pedestal portion and a lower relatively narrow pedestal portion, each of said riser portions having a curved internal element in said relatively narrow pedestal portion and the elements of the two riser portions being opposed and defining plural spaced cable chambers, means forming a seal between said first and second riser portions, a cap engaging with said riser portions and closing said splice chamber defined thereby, the cap including sealing means between an edge of the cap and edges of the first and second riser portions which the cap abuts, means maintaining the riser portions in contacts, means in said splice chamber for supporting cables, ribs in each cable chamber defining an upper seal chamber at a portion of each cable chamber adjacent said splice chamber, ribs defining a lower seal chamber adjacent the portion of the cable chamber communicating with the ground, and said means for supporting cables comprising loops on the interior wall of said splice chamber on one of said riser portions.

3. The pedestal of claim 2. wherein said cap comprises a bolt extending downwardly from the center thereof into said splice chamber, a threaded tubular member having threaded engagement on said bolt, hooks extending from said threaded tubular member, and further comprising loops on the inner walls of said riser portions retaining said hooks, whereby said cap may be securely fastened to said riser portions by rotation thereof and thereby form a seal for said splice chamber.

4. The pedestal of claim 3 wherein the means forming a seal between the riser portions comprises flanges at opposite sides of each riser portion.

5. The pedestal of claim 4 in which the means maintaining said first and second riser portions in contact comprises first and second slidable closure members, each closure member containing one flange of each riser portion in abutment.

6. A pedestal closure for enclosing above-ground extensions of underground cables comprising, a first riser portion, a second riser portion, said first and second riser portions mating and forming an upper pedestal portion comprising a splice chamber, an intermediate tapered pedestal portion and a lower relatively narrow pedestal portion, each of said riser portions having a curved internal element in said relatively narrow pedestal portion and the elements of the two riser portions being opposed and defining plural spaced cable chambers, means forming a seal between said first and second riser portions, a cap engaging with said riser portions and closing said splice chamber defined thereby, the cap including sealing means between an edge of the cap and edges of the first and second riser portions which the cap abuts, means maintaining the riser portions in contact, means in said splice chamber for supporting cables, an air dam bushing extending through one of said riser portions for housing cables leading from said splice chamber to the exterior of said pedestal, terminal blocks supported on the exterior of one of said riser portions, and said cap comprising a bolt extending downwardly from the center thereof into said splice chamber, a threaded tubular member threaded on said bolt, hooks extending from said threaded tubular member, and further comprising loops on the inner walls of said riser portions retaining said hooks, whereby said cap may be secured to said riser portions by rotation thereof and thereby form a seal for the splice chamber.

* * * * *